(12) United States Patent
Liu

(10) Patent No.: US 9,737,137 B1
(45) Date of Patent: Aug. 22, 2017

(54) SUPPORTING BRACKET WITH INTERNAL LATCHING FOR ANGLE ADJUSTMENT

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Chao Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/181,443

(22) Filed: Jun. 14, 2016

(30) Foreign Application Priority Data

Apr. 11, 2016 (CN) .......................... 2016 1 0217874

(51) Int. Cl.
*F16M 1/00* (2006.01)
*A47B 23/04* (2006.01)
*F16M 11/10* (2006.01)

(52) U.S. Cl.
CPC ............. *A47B 23/04* (2013.01); *F16M 11/10* (2013.01); *F16M 2200/021* (2013.01)

(58) Field of Classification Search
CPC ... A47B 23/04; F16M 11/10; F16M 2200/021
USPC ......... 248/123.11, 164, 166, 292.11, 292.12, 248/297.31, 463, 465.1, 688, 676, 919
See application file for complete search history.

(56) References Cited

U.S. PATENT DOCUMENTS

| | | | |
|---|---|---|---|
| 3,126,664 A * | 3/1964 | Gibson | A47B 23/043 248/463 |
| 7,735,196 B2 * | 6/2010 | Centmayer | B60R 1/0617 16/330 |
| 8,220,767 B2 * | 7/2012 | Lin | F16M 11/10 248/127 |
| 8,540,202 B2 * | 9/2013 | Hu | F16M 11/10 108/6 |
| 2013/0181106 A1 * | 7/2013 | Lin | F16M 11/10 248/463 |
| 2013/0299663 A1 * | 11/2013 | Pan | F16M 11/10 248/371 |
| 2016/0015168 A1 * | 1/2016 | Sun | F16M 13/00 248/447.1 |

* cited by examiner

*Primary Examiner* — Gwendolyn Baxter
(74) *Attorney, Agent, or Firm* — Steven Reiss

(57) ABSTRACT

A bracket for supporting electronic devices includes first and second supporting arms, the first connecting arm defining a first connecting portion and the second connecting arm defining a second connecting portion. The first connecting portion and the second connecting portion can pivot around each other. Either the first connecting portion or the second connecting portion can define a positioning protrusion which is in use hidden, and the other can define a plurality of positioning grooves which are also hidden in use. The positioning protrusion being received in different positioning grooves renders the angle between the first supporting arm and the second supporting arm adjustable.

7 Claims, 5 Drawing Sheets

SUPPORTING BRACKET WITH INTERNAL LATCHING FOR ANGLE ADJUSTMENT

CROSS-REFERENCE TO RELATED APPLICATIONS

This application claims priority to Chinese Patent Application No. 201610217874.1 filed on Apr. 11, 2016.

FIELD

The subject matter herein generally relates to supporting brackets.

BACKGROUND

Electronic devices, such as flat computers and mobile phones, need to be supported on a platform so a user can watch a film without holding the electronic device in the hands. Therefore, brackets for supporting the electronic devices are needed.

BRIEF DESCRIPTION OF THE DRAWINGS

Implementations of the present technology will now be described, by way of example only, with reference to the attached figures.

DETAILED DESCRIPTION

Figure 1:
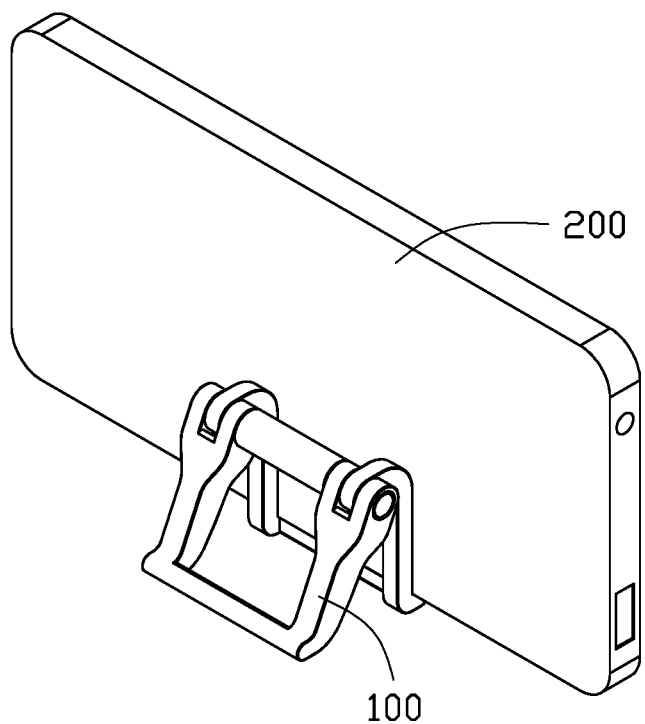
FIG. 1 is an isometric view illustrating an embodiment of a bracket supporting an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series and the like.

FIG. 1 illustrates a first embodiment of a supporting bracket 100 configured for supporting an electronic device 200. In the embodiment, the electronic device 200 can be a flat computer, a mobile phone, a digital photo frame, and other electronic devices 200 need to be supported. In this embodiment, the supporting bracket 100 is made of rigid materials.

Figure 2:
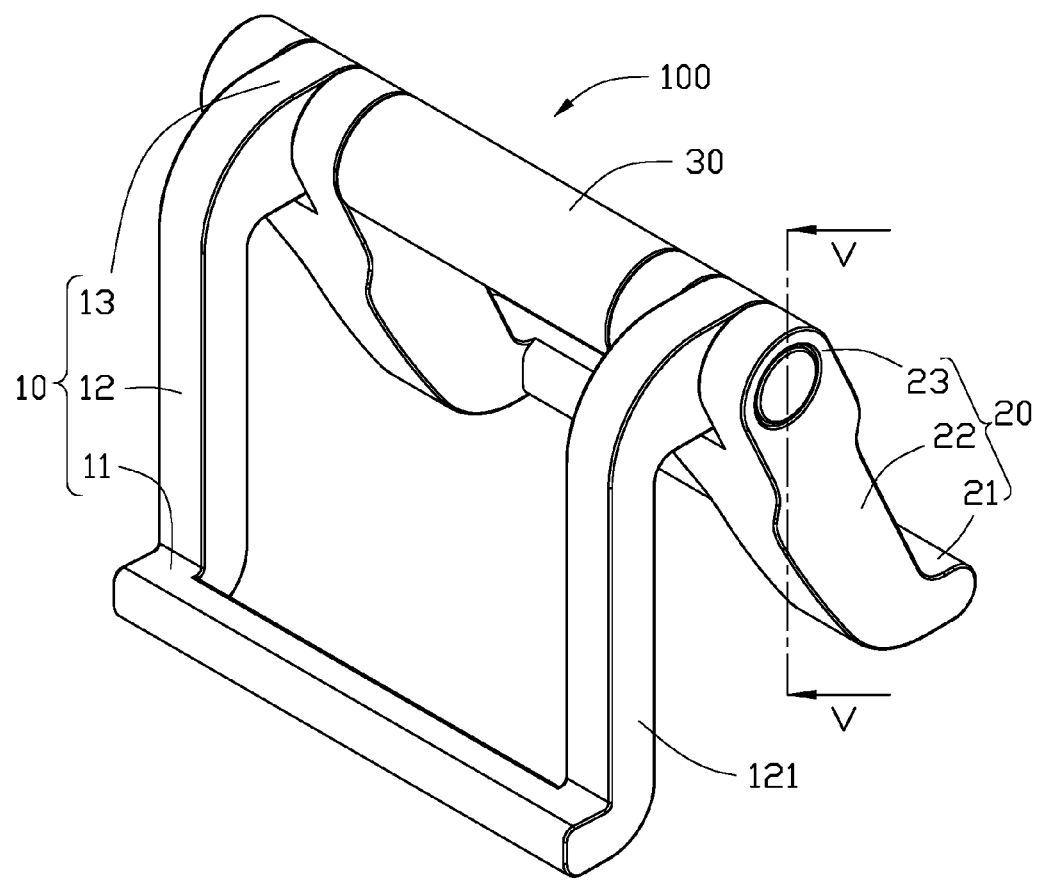
FIG. 2 is an isometric view illustrating an embodiment of the bracket of FIG. 1.
Figure 4:
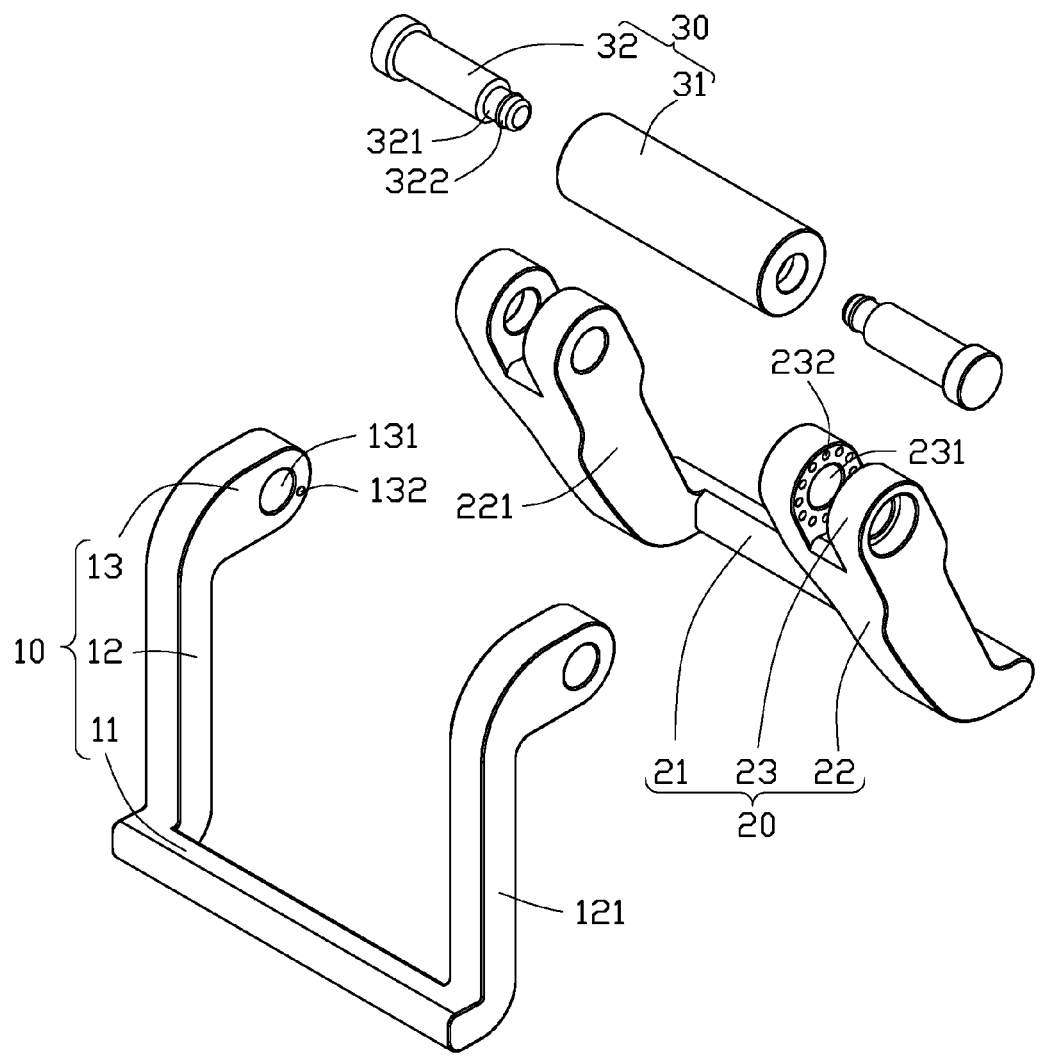
FIG. 4 is an exploded view of the bracket of FIG. 2.

Referring to FIG. 2 and FIG. 4, in the first embodiment, the supporting bracket 100 includes a first supporting arm 10, a second supporting arm 20, and a connecting element 30. The first supporting arm 10 is pivotally connected to the second supporting arm 20 via the connecting element 30.

The first supporting arm 10 includes a carrying portion 11, a first supporting portion 12, and a first connecting portion 13.

In the first embodiment, the carrying portion 11 is a platform which is strip shaped, and on which the electronic device 200 can be placed. In other embodiments, the carrying portion 11 can further define a groove or other latching elements to form an attachment with the electronic device 200. In the first embodiment, the first supporting portion 12 includes two sub arms 121 which are both perpendicularly connected to ends of the carrying portion 11. The two sub arms 121 are located in a same plane, and an acute angle or a right angle is formed between the carrying portion 11 and the plane of the supporting portion 12, thus when the electronic device 200 is placed on the carrying portion 11, the back of the electronic device 200 leans against the first supporting portion 12. In the first embodiment, the number of the first connecting portions 13 is two and the two first connecting portions 13 are connected to free ends of the sub arms 121 of the first supporting portion 12. Each first connecting portion 13 defines a through hole 131. A sidewall of each first connecting portion 13 defines at least one positioning protrusion 132.

Figure 3:
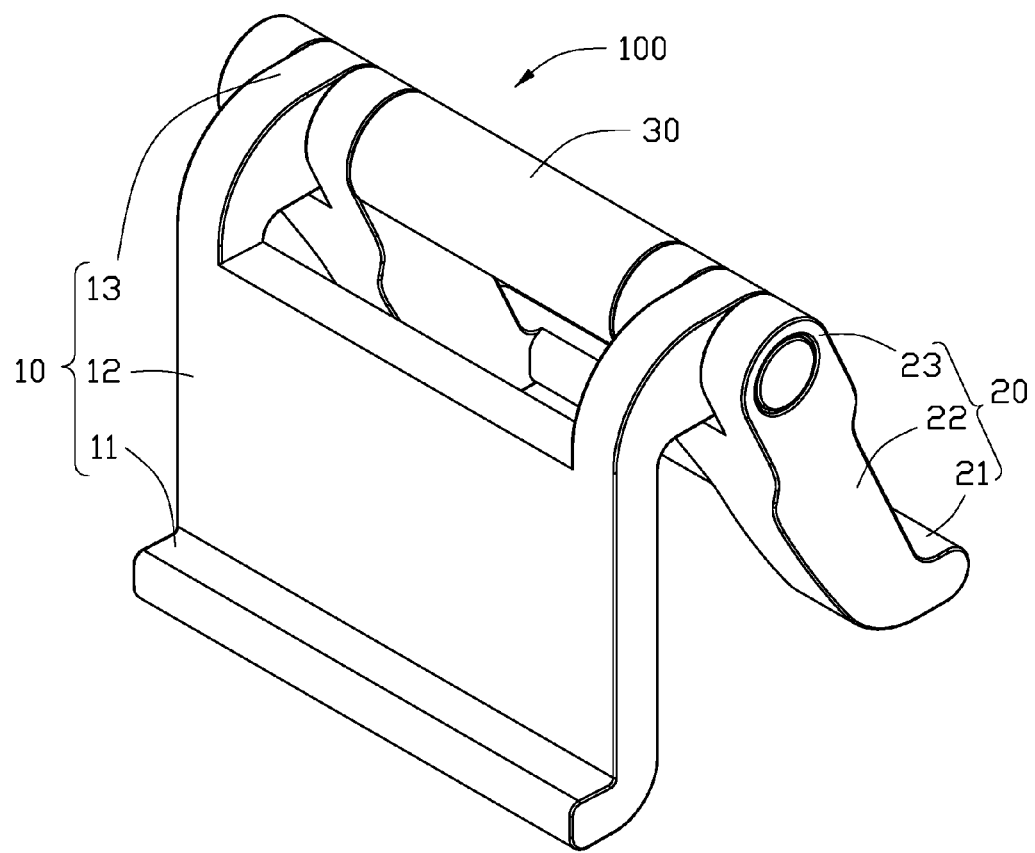
FIG. 3 is an isometric view illustrating another embodiment of a bracket.

In a second embodiment, as shown in FIG. 3, the first supporting portion 12 is a plate, the carrying portion 11 projects from the first supporting portion 12 along a bottom side of the first supporting portion 12. The first connecting portion 13 is connected to an end of the supporting portion 12 which is away from the carrying portion 11.

In the first and the second embodiments, the second supporting arm 20 includes a resisting portion 21, a second supporting portion 22, and a second connecting portion 23.

The resisting portion 21 is strip shaped and is configured to rest on a platform, for example a desk top. The second supporting portion 22 includes two rods 221 which are connected to ends of the resisting portion 21. In the first and second embodiments, the number of the second connecting portions 23 is two and the two second connecting portions 23 are connected to the distal ends (away from the resisting portion 21) of the two rods 221 of the second supporting portion 22.

In the first and second embodiments, each of the two second connecting portions 23 is U-shaped. Each branch of the second connecting portion 23 defines a connecting hole 231. The connecting holes 231 correspond to the through holes 131 defined in the first connecting portion 13. When the two first connecting portions 13 are received in the two second connecting portions 23, the connecting holes 231 are aligned with the through holes 131.

In the first and second embodiments, the second connecting portion 23 further defines a number of positioning grooves 232 corresponding to the at least one positioning protrusion 132, as shown in FIG. 4. The positioning grooves 232 are arranged around the connecting holes 231. The positioning protrusion 132 is engagable into different positioning grooves 232, thus an angle between the first supporting arm 10 and the second supporting arm 20 can be adjustable.

In the first and second embodiments, at least one of the positioning protrusions 132 and the positioning grooves 232 are made of elastic material, such as rubber or flexible plastic.

In other embodiment, the positioning protrusion 132 can be defined on the second connecting portion 23 and the positioning grooves 232 can be defined in the first connecting portion 13.

Figure 5:
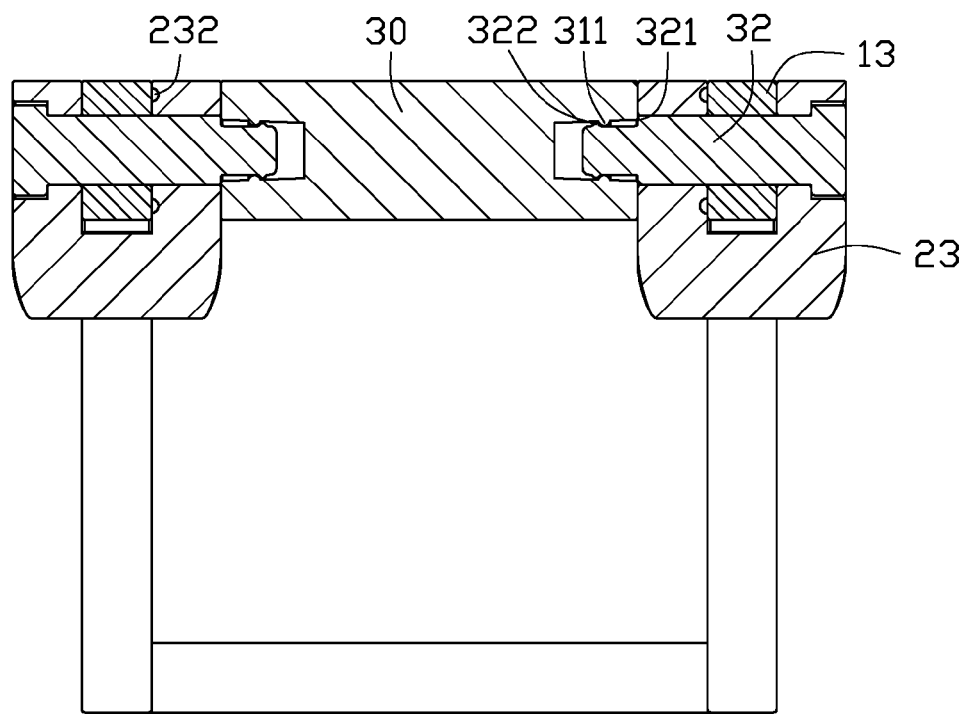
FIG. 5 is a cross sectional view illustrating an embodiment of the bracket of FIG. 2.

Referring to FIG. 4 and FIG. 5, in the first embodiment, the connecting element 30 includes a connecting shaft 31 and two shaft pins 32. The connecting shaft 31 is cannular, a first latching portion 311 protrudes from an inner sidewall of two ends of the connecting shaft 31. Each shaft pin 32 is rod-shaped, a stepped stopping portion 321 is defined on an outer sidewall of each shaft pin 32. Each shaft pin 32 further defines a second latching portion 322 at its distal end, the second latching portion 322 is configured to engage with the first latching portion 311.

In other embodiments, the connecting element 30 can be other well-known structural components.

In the first and second embodiments, when assembling the bracket 100, the through holes 131 are first aligned with the connecting holes 231, and the positioning protrusion 132 is engaged in one of the positioning grooves 232. Then, the connecting shaft 31 is placed between the two rods of the second supporting portion 22, and the two shaft pins 32 are inserted into the connecting hole 231 and the through hole 131, until the stepped stopping portions 321 of the two shaft pins 32 meet the ends of the connecting shaft 31, and each of the second latching portions 322 latches to the first latching portion 311. Thus, the first supporting arm 10 is rotatably connected to the second supporting arm 20.

In use, when a user rotates the first supporting arm 10 towards or away from the second supporting arm 20, the first supporting arm 10 and the second supporting arm 20 rotate relative to the connecting element 30, and the positioning protrusion 132 can be received in different positioning grooves 232, thus the angle of the bracket 100 can be adjusted.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A supporting bracket with internal latching for angle adjustment comprising:
   a first supporting arm comprising a carrying portion for supporting an electronic device, a first supporting portion, and a first connecting portion;
   a second supporting arm comprising a resisting portion, a second supporting portion, and a second connecting portion; and
   a connecting element, the first supporting arm being pivotally connected to the second supporting arm via the connecting element;
   wherein one of the first connecting portion and the second connecting portion defines at least one positioning protrusion, and the other one of the first connecting portion and the second connecting portion defines a plurality of positioning grooves, when the positioning protrusion is received in different positioning grooves, an angle between the first supporting arm and the second supporting arm is adjusted, wherein the first connecting portion defines a through hole, the second connecting portion defines a connecting hole corresponding to the through hole, the connecting element comprises a connecting shaft and two shaft pins, the connecting shaft is cannular, a first latching portion protrudes from an inner sidewall of two ends of the connecting shaft, each shaft pin is rod-shaped, a stepped stopping portion is defined on an outer sidewall of each shaft pin, each of the shaft pins further defines a second latching portion at its distal end, the second latching portion is configured to engage with the first latching portion.

2. The bracket according to claim 1, wherein the carrying portion is a platform which is strip shaped, the first supporting portion comprises two sub arms which are respectively perpendicularly connected to two ends of the carrying portion, the number of the first connecting portion is two, the two first connecting portions are respectively connected to the two sub arms of the first supporting portion.

3. The bracket according to claim 2, wherein the resisting portion is strip shaped, the second supporting portion comprises two rods which are connected to ends of the resisting portion, the number of the second connecting portion is two, and the two second connecting portions are respectively connected to free ends of the two rods of the second supporting portion.

4. The bracket according to claim 1, wherein the first supporting portion is a plate, the carrying portion projects from the first supporting portion along a bottom side of the first supporting portion.

5. The bracket according to claim 4, wherein the resisting portion is strip shaped, the second supporting portion comprises two rods which are respectively connected to two ends of the resisting portion, the number of the second connecting portion is two, and the two second connecting portions are respectively connected to a side of the second supporting portion.

6. The bracket according to claim 1, wherein at least one of the positioning protrusion and the positioning grooves is made of elastic material.

7. The bracket according to claim 1, wherein the bracket is made of rigid materials.

\* \* \* \* \*